UNITED STATES PATENT OFFICE.

JOHN HOBBS, OF BOSTON, MASSACHUSETTS.

PROCESS OF REFINING FATS.

SPECIFICATION forming part of Letters Patent No. 280,822, dated July 10, 1883.

Application filed February 28, 1883. (No specimens.)

*To all whom it may concern:*

Be it known that I, JOHN HOBBS, a citizen of the United States, residing at the city of Boston, in the county of Suffolk and Commonwealth of Massachusetts, have invented a certain new and useful Process for Refining Fats, which is fully set forth in the following specification.

My invention has reference to the manufacture of a superior lard or fat; and it consists in a process of refining fat from the leaf of the hog for culinary or other purposes where a fine article of lard is required to be used; further, in deodorizing the peculiar flavor characteristic of the fat of the hog, which peculiar flavor is largely in the tissue of the fat. In the rendering of the fat I find that the fat largely takes up the flavor of the tissue, and therefore the process of deodorizing should take place, as far as possible, before the fats are rendered.

Hitherto various processes have been used for refining the fat of the hog; but no one has heretofore acted on the fact which I have herein stated and described—a process of deodorizing the fat before it is rendered. For this purpose I have invented an improved process of deodorizing the fat, which I will now proceed to describe. I take leaf-lard and finely grind it, after which I mix it thoroughly in the proportion of a bag or two bushels of salt to a ton of fat. It is then placed in tanks containing cold water, where it is kept very cold for two or three days, when it is worked over with spades or other suitable implements three or four times a day. At the end of this time it is rendered in a water bath at a low temperature, and as quickly as possible, to remove the fat from the tissue. I am enabled also to further deodorize the pure fat by using a solution made from a half to a pound of nitrate of potassa, and the same quantity of bicarbonate of soda dissolved in two gallons of water, for about two tons of fat. This solution I sprinkle on the surface of the molten fat, which immediately falls, leaving the fat entirely odorless. The molten fat is then drawn off from the tissue into settling-basins, where the fat is clarified by the use of very finely-powdered salt sifted on the top. After resting a sufficient time the pure deodorized and clarified fat is drawn off and cooled as rapidly as possible. By experiment I have found that fat can be deodorized by the process which I have described, even if the solution last named is not used; but I prefer to use the full process as I have described it, as I find a better result is obtained.

Having now described my invention, what I claim as new, and desire to secure by Letters Patent, is—

The hereinbefore-described process of refining fats, which consists in first finely grinding the fat of the leaf of the hog, mixing it thoroughly with salt, placing it in tanks of cold water for two or three days, when it is worked over, as described, then rendering it at a low temperature, and as quickly as possible, with or without adding the solution mentioned, then drawing it off from the tissue, clarifying it, and again drawing it off and cooling it, all substantially as described.

In witness whereof I have hereunto set my hand.

JOHN HOBBS.

Witnesses:
WM. B. WRIGHT,
WM. B. H. DOWSE.